Nov. 7, 1967    C. MENDELSOHN    3,350,777
METHOD OF FABRICATION OF ELECTRICAL HEATER
Original Filed Jan. 7, 1963

INVENTOR.
CHARLES MENDELSOHN
BY George B. Aujrock
ATTORNEY

United States Patent Office 3,350,777
Patented Nov. 7, 1967

3,350,777
METHOD OF FABRICATION OF ELECTRICAL HEATER
Charles Mendelsohn, Monsey, N.Y., assignor to General Precision Inc., Little Falls, N.J., a corporation of Delaware
Original application Jan. 7, 1963, Ser. No. 249,624. Divided and this application Feb. 19, 1965, Ser. No. 440,052
3 Claims. (Cl. 29—620)

This invention relates to electrical resistance heating devices and methods of their manufacture.

This application is a division of application Ser. No. 249,624, filed Jan. 7, 1963 in the name of Charles Mendelsohn, which application was assigned to the same assignee as the present invention and is now abandoned.

Electrical resistance heating and a vast number of heating devices of diverse types which employ this principle are widely known in the art. These devices are used in an almost countless number of applications and it would seem that a size and type suitable to any need must be available. Such is not the case, however.

In the gyroscopes and stable platforms used in inertial guidance systems, both space and weight are at a very high premium and there has long existed a great need for heating elements of extremely small thickness dimensions (e.g., 0.005 to 0.008″) and a power density in the order of at least 40–60 watts per square inch.

Heretofore, heating of gyros has been accomplished by means of hand-assembled arrangements consisting of Nichrome wires embedded between plastic sheets or wrapped around the gyro and encapsulated with epoxy.

The disadvantages of these prior art heating arrangements, aside from the high cost engendered by their hand assembly, stem from the fact that the completed units are quite thick; consequently, they cannot be installed for optimum heating of the platform. This, in turn, may lead to larger-than-necessary power consumption and/or insufficient or un-uniform heating.

The fundamental object of the present invention is to overcome or mitigate at least one of the problems extant in the prior art as outlined above.

A more particular object is the provision of electrical resistance heater elements which are extremely thin, flexible, durable and have a relatively high power capacity.

Another object is the provision of electrical resistance heater elements which are particularly, if not exclusively, adapted for use in heating gyros, stable platforms, and the like.

A further object is the provision of electrical resistance heater elements which do not require manual assembly and are, therefore, lower in cost than comparable heater elements known heretofore.

A still further object is the provision of methods for fabrication of heater elements characterized as in the preceding objects.

To the fulfillment of these and further objects, the present invention contemplates electrical resistance heaters comprising a laminated assembly of at least three flexible film-like layers arranged and bonded together in congruent superposition. At least the inner surfaces of the outer layers are electrically non-conductive, the intermediate layer being composed of at least one continuous elongated strip of electrical resistance heating material. Electrical contacts to spaced points on the strip, accessible through the outer layers, are provided.

Briefly stated, the method of fabrication contemplated by the invention comprises: providing a first film at least one surface of which is electrically non-conductive; forming on the one surface a film of electrical resistance heating material in the form of at least one narrow continuous strip having electrical contacts at spaced points thereon; and applying a second film of flexible material, having at least one electrically non-conductive surface, over said strip and bounding said first and second films together with the respective non-conductive surfaces thereof in confronting relation.

Additional objects of the invention, its advantages, scope and the manner in which it may be practised will be more fully apparent to persons conversant with the art from the following description of exemplary embodiments thereof taken in conjunction with the subjoined claims and the annexed drawings in which like parts are designated by like reference numerals throughout the several views and FIGURE 1 is a plan view of a heater element according to the present invention;

Figure 1:
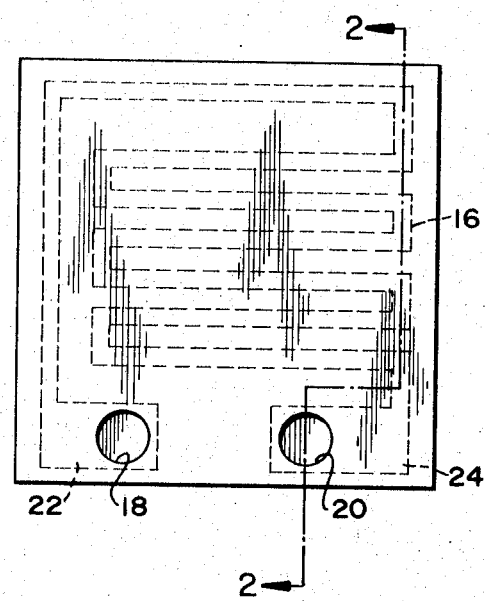
Figures 2, 3:
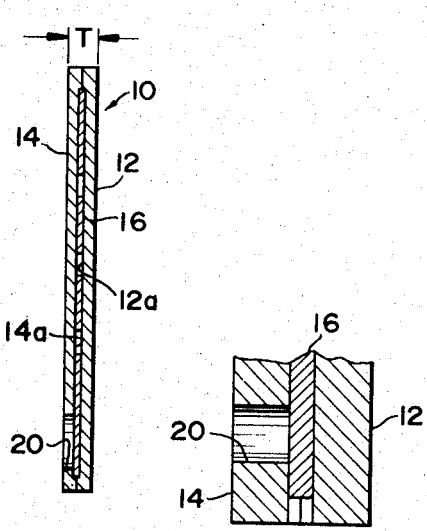
FIGURE 2 is a sectional view on line 2—2 of FIGURE 1 looking in the direction of the arrows.
FIGURE 3 is an enlargement of a portion (the lower end) of FIGURE 2.

Referring now to the drawings and, first, particularly to FIGURES 1, 2 and 3, there is illustrated a heater element 10 consisting of three thin flexible layers 12, 14 and 16 laminated in congruent superposition.

While element 10 is shown in FIGURE 1 as being square in plan configuration it will be understood that the variety of shapes and dimensions which may be used is limited only by the needs of the particular application and the feasibility of manufacture. On the other hand the overall thickness dimension T of element 10 is in all cases extremely small, i.e., in the order of a few thousandths of an inch. It is well apparent, therefore, that the sectional view of FIGURE 2 is a gross exaggeration of the thickness of the element necessary to permit satisfactory illustration.

In one practical embodiment of element 10 the total thickness dimension was .005 inch, which was comprised of two outer layers, 12 and 14, each .002 inch in thickness and intermediate layer 16, .001 inch in thickness.

In the embodiment illustrated in FIGURES 1, 2 and 3, outer layers 12 and 14 consist of aluminum foil at least the inner surfaces 12a and 14a, respectively, of which are hard anodized to provide an electrical insulation layer which is not separately shown in the drawings.

The intermediate layer 16 is a highly convoluted thin strip of resistance heating alloy foil preferably of the nickel-chromium alloy variety, e.g., Nichrome.

One of the outer laminations, foil layer 14 in the illustrated embodiment, contains a pair of clearance holes 18, 20 suitably located to register with contact pad enlargements 22, 24 at the respective ends of strip 16, thus providing access to these enlargements for making electrical connections thereto. It will be understood that while a single, uniformly-distributed, regularly-convoluted strip 16 has been shown and described in the interests of simplicity, a plurality of such strips, intertwined, interdigitated, or strips having convolutions confined to or concentrated in selected regions, can be employed to regulate and/or vary the pattern of heating or other heat flow parameters.

In such an event at least one additional access opening would be provided for each additional strip (assuming the use of one opening for a common ground or return connection).

If desired, the laminations may be preformed to fit a particular configuration of the part to be heated.

The method contemplated by the invention for fabrication of element 10 is as follows. A sheet of aluminum foil is provided with a hard anodized coating on at least one of its major surfaces. To the anodized surface is bonded, by means of a high temperature epoxy, a sheet of Nichrome foil. An epoxy adhesive such as that commercially available under the designation "Bondmaster M-688" is well suited to this purpose.

The desired convoluted strip pattern of layer 16 is then defined on the exposed surface of the Nichrome foil in the form of an etch-resistant coating selectively applied by masking or photoresist techniques well known in the art and widely used in the fabrication of semiconductor devices, for example. The Nichrome foil surface is then exposed to an etching agent which attacks the areas which are not covered by the resistant coating. After the exposed Nichrome areas are completely etched away, the resistant coating may be removed leaving the desired convoluted patern constituting layer 16.

It will be understood that if the etching step involves contact of the aluminum foil with the etchant, this also should be covered with a suitable protective coating, e.g., wax which is subsequently removed.

A second sheet of aluminum foil, having a hard anodize coating on at least one surface and suitable access openings such as 18, 20 is provided; to complete the element this sheet is placed over the Nichrome pattern with its anodized surface confronting that of the first aluminum sheet and with the access openings in registration with contact pad enlargements 20, 22 and cemented in position with a suitable epoxy adhesive or the like.

While epoxy adhesives have been specified for the bonding operations it will be understood that other suitable materials may be employed. As a general rule high temperature epoxies give satisfactory results up to about 200° C.; where higher temperatures are encountered, ceramic-type adhesives (e.g., Corning Glass Company's "Pyro-Ceram") should be used.

In use, the heating element is placed with one surface in contact with the part to be heated; due to the high thermal conductivity of aluminum, heat transfer from the Nichrome layer to the part to be heated is accomplished with high efficiency. Moreover, the aluminum layer on the opposite side of the Nichrome layer with respect to the member to be heated, functions as a reflector further improving heating efficiency. If desired, a black anodize coating can be applied to the appropriate exterior aluminum surface to enhance its emissivity.

Because the element is so thin and flexible it is susceptible of being wrapped closely around parts to be heated, thus enabling the establishment of intimate surface contact between the two with concomitant high efficiency in heat transfer. A heating element of the type just described has a power handling capacity in excess of 200 watts per square inch.

Figure 4:
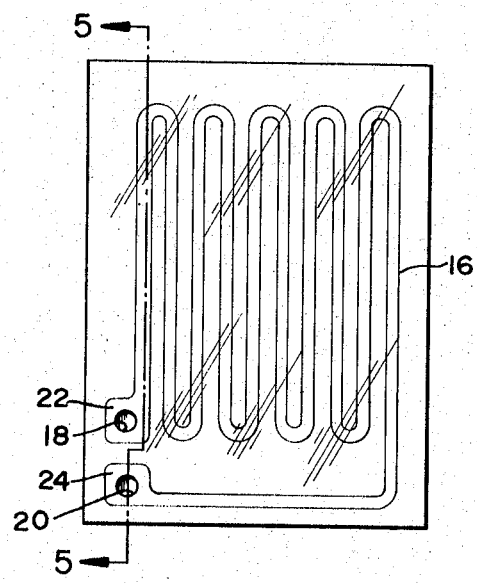
FIGURE 4, 5 and 6 are views similar to FIGURE 1, 2 and 3, respectively, showing a modified embodiment of the invention.
Figures 5, 6:
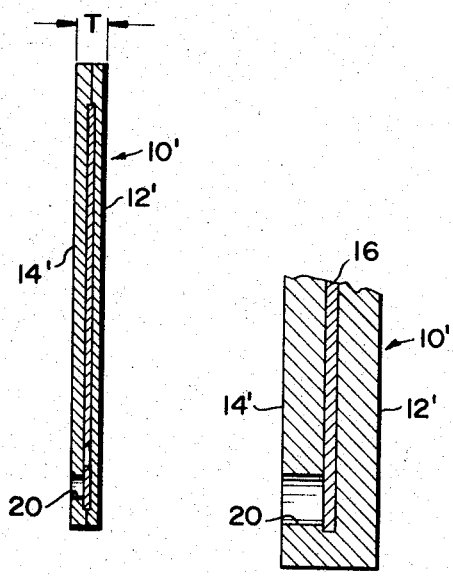

A modified form of heating element 10' is shown in FIGURES 4, 5, 6. Element 10' is similar, and may be identical, in structure to that shown in FIGURES 1-3; however, the outer laminations 12' and 14' consist of epoxy-cementable polytetrafluoroethylene films (such as the Du Pont Company's "FEP-C" Teflon). The convoluted resistance heater strip 16 may be formed in the manner already described and the laminations bonded together with high temperature epoxy adhesive.

If desired, a fourth layer, not shown, consisting of a thin film (in the order of 0.001 inch thick) of aluminum may be applied to the exterior surface of one of the outer layers 12', 14' to serve as a heat reflector.

An alternative form of construction contemplated by the invention is an element in which one of the outer layers is hard-anodized aluminum foil as in the FIGURES 1-3 embodiment and the other is cementable polytetrafluoroethylene as in FIGURES 4-6.

Heating elements incorporating Teflon laminations in accordance with the foregoing description are capable of up to 75 watts per square inch.

While there have been described what at present are believed to be the preferred embodiments of this invention it will be obvious to those skilled in the art that various changes and modifications may be made therein without departing from the invention, and it is aimed, therefore, to cover in the appended claims all such changes and modifications as fall within the true spirit and scope of the invention. For example, the convoluted resistance heating strip may be applied by vapor deposition of Nichrome or the like through an appropriately apertured mask.

What is claimed is:

1. A method of fabricating an electrical resistance heater comprising:
    providing a sheet of aluminum foil hard anodized on at least one major surface;
    bonding a sheet of Nichrome foil to the anodized surface of the aluminum foil;
    chemically etching away selected regions of said Nichrome foil sheet to form a pattern made up of at least one continuous, highly-convoluted narrow strip of Nichrome traversing substantially the entire anodized surface of said aluminum foil; and
    bonding a sheet of material having at least one electrically non-conductive surface to said aluminum foil with said non-conductive surface confronting the anodized surface of the aluminum foil and covering said Nichrome strip.

2. The method of claim 1 where said sheet of material is a film of tetrafluoroethylene polymer.

3. The method of claim 1 where said sheet of material is aluminum foil having at least said one surface thereof hard anodized.

References Cited

UNITED STATES PATENTS

| | | | |
|---|---|---|---|
| 2,360,264 | 10/1944 | Osterheld | 29—155.7 X |
| 2,492,315 | 12/1949 | Osterheld | 219—38 |
| 2,680,800 | 6/1954 | Chandler | 219—19 |
| 2,719,213 | 9/1955 | Johnson | 339—212 |
| 2,997,521 | 8/1961 | Dahlgren | 156—3 X |
| 3,095,340 | 6/1963 | Triller | 156—8 |

JOHN F. CAMPBELL, *Primary Examiner.*

J. M. ROMANCHIK, J. CLINE, *Assistant Examiners.*